Figure 1:
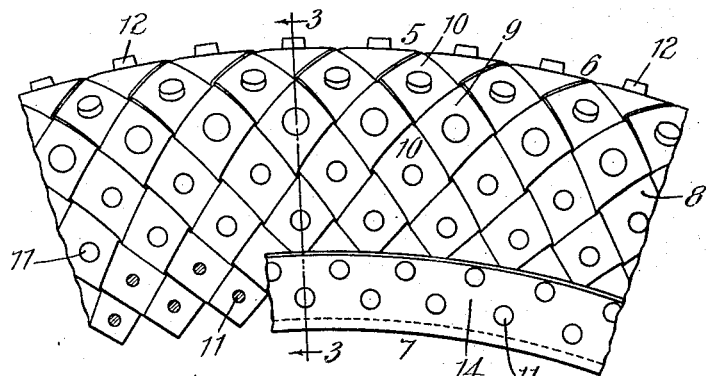

S. C. BELLOU.
VEHICLE TIRE.
APPLICATION FILED DEC. 28, 1914.

1,177,593.

Patented Apr. 4, 1916.

Witnesses.
Franklin E. Low.
Herman R. Hoffman.

Inventor:
Stephen C. Bellou,
by his attorney,

UNITED STATES PATENT OFFICE.

STEPHEN CH. BELLOU, OF BROCKTON, MASSACHUSETTS.

VEHICLE-TIRE.

1,177,593.  Specification of Letters Patent.  Patented Apr. 4, 1916.

Application filed December 28, 1914. Serial No. 879,266.

*To all whom it may concern:*

Be it known that I, STEPHEN CH. BELLOU, a subject of the King of Greece, residing at Brockton, in the county of Plymouth and State of Massachusetts, have invented new and useful Improvements in Vehicle-Tires, of which the following is a specification.

This invention relates to improvements in vehicle tires and the purpose thereof is to provide a tire constructed of resilient material, preferably metal, which shall be much stronger and more durable than the tires constructed of rubber and which shall at the same time have the local yielding feature and resiliency which renders the pneumatic tire so much better adapted to use on motor vehicles than any other type of tire.

The invention consists in the combination and arrangement of parts set forth in the following specification and particularly pointed out in the claim.

Figure 2:
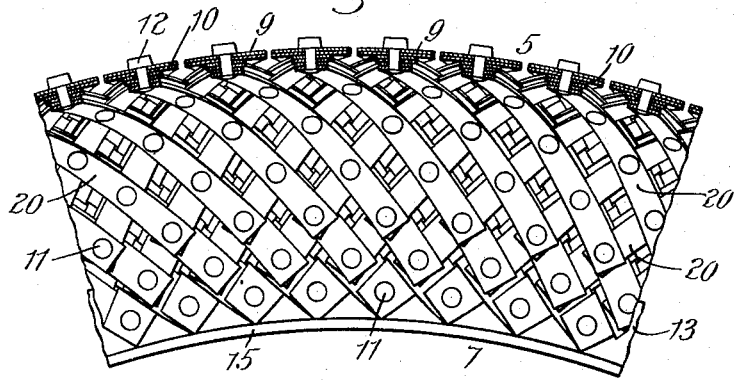
Figure 4:
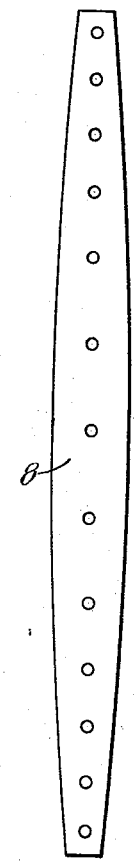
Figure 3:
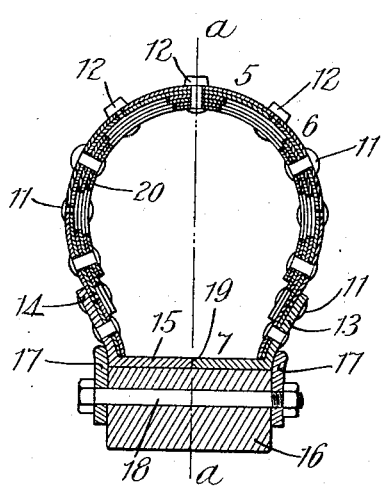

Referring to the drawings:

Figure 1 is a side elevation of a section of a tire embodying my invention, parts of which are broken away. Fig. 2 is a longitudinal section, partly in elevation, of the portion of the tire illustrated in Fig. 1. Fig. 3 is a transverse section of the tire taken on the line 3—3 of Fig. 1. Fig. 4 is a detail of one of the strips of which the tire is constructed.

Like numerals refer to like parts throughout the several views of the drawings.

In the drawings, 5 is a tire consisting of a casing 6 and rim 7 to which the casing 6 is secured. The casing 6 is preferably arch shaped and constructed of strips of material 8, preferably metal, arranged in two series 9 and 10, each of said series being helically disposed or in other words arranged obliquely to the central plane of rotation of said tire, said plane being indicated by the line "*a—a,*" Fig. 3.

The strips constituting the series 10 are oppositely disposed relatively to the strips constituting the series 9 and interwoven therewith. These strips are formed tapering from the central portion thereof toward opposite ends (see Fig. 4) with the widest portion thereof at the center, which taper varies according to the size of the wheel and transverse conformation preferred.

The strips constituting each series are placed edge to edge, or as near so as the interweaving of said strips will permit, in order to make a casing which is substantially hole proof and thus capable of resisting dirt and like substances. The strips of both series are also secured together substantially at each of the crossing points thereof by suitable fastening devices 11, preferably rivets. The rivets along the tread portion of said tire have enlarged heads 12 which constitute means to prevent skidding of the tires and at the same time protecting the metal strips from direct contact with the surface of the ground.

The edges of the casing 6 are secured to rings 13 and 14, preferably by means of the rivets 11, which serve to secure the extremities of the strips 9 and 10 together. The rings 13 and 14 constitute outwardly projecting peripheral flanges and form parts of the rim 7. Said rim has a cylindrical portion 15 adapted to engage the periphery of the felly 16 of a wheel, said rim being secured on said felly, preferably by a pair of rings 17 engaging opposite faces of said felly 16 and secured thereto by bolts 18.

The rim 7 is formed in two sections divided circumferentially at 19 thus to facilitate the riveting of the sides of the casing to said rings 13 and 14.

When it is desired to increase the supporting power of the tire 5, the strips 9 and 10 may, if desired, be increased in thickness. The preferred method of accomplishing the above result is however to provide stiffeners 20 extending transversely of the tread portion of said tire within said casing, said stiffeners being preferably arranged parallel with the strips 9 or 10, or both as the case may be and secured thereto by the rivets 11. One or more series of stiffeners may be provided according to the stiffness or the supporting power required. In the present case four series of said stiffeners are shown, two of which are parallel with the series of strips 9 and the other two parallel with the series of strips 10.

Having thus described my invention what I claim and desire by Letters Patent to secure is:

A vehicle tire comprising a series of interwoven resilient strips of material disposed obliquely to the plane of rotation of said tire, arranged substantially edge to edge and bent to form an arched casing and a plurality of series of reinforcing resilient strips arranged within and substantially parallel with the strips constituting said series of interwoven resilient strips, the strips of said several series decreasing in length from the outermost toward the innermost of said series of reinforcing strips and means for securing the several series of strips of material together.

In testimony whereof I have hereunto set my hand in presence of two subscribing witnesses.

STEPHEN CH. BELLOU.

Witnesses:
SYDNEY E. TAFT,
HARRY KENEKLIS.